United States Patent
Shaler et al.

[11] 3,797,023
[45] Mar. 12, 1974

[54] STYLUS ASSEMBLIES
[75] Inventors: David Shaler, Madison; John H. Long, Oakland, both of N.J.
[73] Assignee: Muirhead, Inc., Mountainside, N.J.
[22] Filed: Feb. 5, 1973
[21] Appl. No.: 329,648

[52] U.S. Cl. ...... 346/139 A, 346/139 R, 346/139 C
[51] Int. Cl. ...................... G01d 15/16, G01d 15/18
[58] Field of Search ......... 346/139 C, 139 A, 139 R

[56] References Cited
UNITED STATES PATENTS
2,723,897 11/1955 Zabriskie .......................... 346/139 C
2,141,974 12/1938 Finch .............................. 346/139 C

*Primary Examiner*—Richard B. Wilkinson
*Assistant Examiner*—Vit W. Miska
*Attorney, Agent, or Firm*—Edward T. Connors

[57] ABSTRACT

A stylus construction utilizing a spring urged stylus. In one embodiment the stylus is withdrawn until an actuating member contacts a ramp lifting the stylus in operating position. In the other embodiment the stylus is spring urged outwardly and the actuating member contacts the ramp to withdraw the stylus. The construction prevents damage to the recording sheet from the stylus as the stylus approaches the recording sheet to start the recording line.

10 Claims, 7 Drawing Figures

PATENTED MAR 12 1974　　　　　　　　　　　　　　　　3,797,023

STYLUS ASSEMBLIES

BACKGROUND OF THE INVENTION

This invention relates to facsimile recorders of the type including a plurality of styli mounted on a belt, and more particularly to a stylus assembly therefor.

Facsimile recording of copy is commonly effected on a continuous sheet of recording medius such as treated paper as it is advanced past a scanning line position. A plurality of electric styli are spaced along an endless toothed belt traveling around pulleys so that the styli successively pass across the scanning line position to mark the recording sheet in accordance with received facsimile signals.

A plurality of styli are used so that one stylus is in contact with the recording paper at almost all times during the rotation of the belt. The result of having a plurality of styli is that the copy is being almost continuously recorded.

Constant contact within a desired range of pressure is necessary between the stylus and the recording paper in order to have even recording. The stylus can tear the medium if its pressure is too excessive and skip marking if the pressure is too light.

It is apparent that it is very important that the mass of the stylus be kept at a minimum in order to minimize the strain on the belt as it is rotated. Further, a light mass minimizes the possibility of the development of oscillations which might produce jitter in the recorded copy.

Heretofore stylus designs have been proposed in which the stylus is spring urged against the recording paper so as to provide uniform contact across the scan ling. Such a construction is shown in U.S. Pat. No. 2,723,897 issued to D.M. Zabriskie. In this construction a cam surface is provided adjacent the starting edge of the recording paper so that the stylus point slides over the cam surface and the stylus is depressed away from the edge of the paper and thereafter released. It is obvious that this construction tends to cause wear of the stylus point as it slides over the cam surface.

Another construction used to provide tensioned contact of the stylus with the paper is shown in U.S. Pat. No. 3,683,412 issued to Edmund F. Priessnetz in which the recording paper is given a frictional drag between rollers to maintain tension on the web. In this patent the stylus is not spring mounted. However, a device is used to depress the edge of the paper so that the stylus may pass over the depressed edge of the paper without tearing it. Although this construction might be satisfactory for electric discharge marking, it is believed that difficulty might be had to achieve proper contact of the stylus with the paper under varying conditions of humidity and paper quality, particularly for use in electrostatic recorders.

SUMMARY OF THE INVENTION

The present invention aims to overcome the difficulties and disadvantages of prior stylus assemblies by providing a stylus assembly in which the stylus tip is resiliently urged against the recording paper with a uniform and optimum pressure and in which the stylus tip is withdrawn as it passes the edge of the recording paper so that the paper is not damaged.

This is accomplished by providing an improved construction utilizing a spring urged stylus in which the spring pressure is released until the stylus is in marking position. The stylus tip is urged against the paper by spring action between the stylus and a cam surface, which advantageously, also acts as a contact surface to transmit the facsimile signal to the stylus. In one embodiment of the construction an in-line arrangement is provided in which the stylus assembly is in a linear assembly with the cam surface positioned opposite the scan line position.

In another embodiment a pivoted cam engaging member is provided so that the stylus is positioned practically in the pitch circle of the toothed belt on which it is mounted, the pivoted construction being used to provide a spring of adequate length for proper stylus contact pressure control. The spring is positioned in the stylus supporting member located on the back of the belt.

Other objects and advantages of the invention will be apparent from the following description and from the accompanying drawing which shows, by way of example, embodiments of the invention.

DESCRIPTION OF THE PREFERRED EMBODIMENTS

Figure 1:
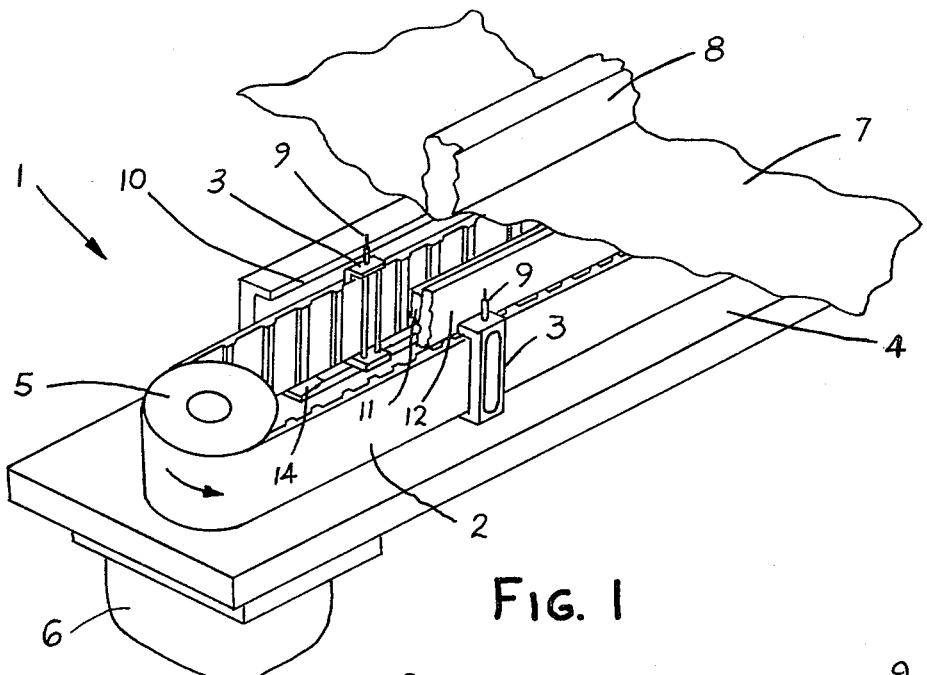
FIG. 1 is a perspective view of a portion of a facsimile recorder illustrating a plurality of stylus assemblies in accordance with the invention mounted on a toothed belt.

Referring to the drawing there is shown in FIG. 1 a portion of a facsimile recorder 1 utilizing a toothed belt 2 and incorporating a plurality of stylus assemblies 3 in accordance with the invention. The facsimile recorder 1 includes a supporting base 4 on which is carried a pair of pulleys 5 of which only one is shown. The pulleys 5 are adapted to be rotated by a motor 6. A sheet of recording medium or paper 7 is moved past a platen 8 by means well known in the art. The platen 8 backs a line of scan past which moves the styli 9 carried in the stylus assemblies 3. Also carried by the supporting base 4 is a guiding surface 10 adapted to contact the rear side of the styli 9. Another guiding member 11 is carried by a support 12 within the area traversed by the toothed belt 2. A stylus paper edge avoidance ramp member 14 is provided. Alternatively, in some constructions the ramp member 14 may be shortened as described hereinafter.

Figures 2, 3, 5, 6:
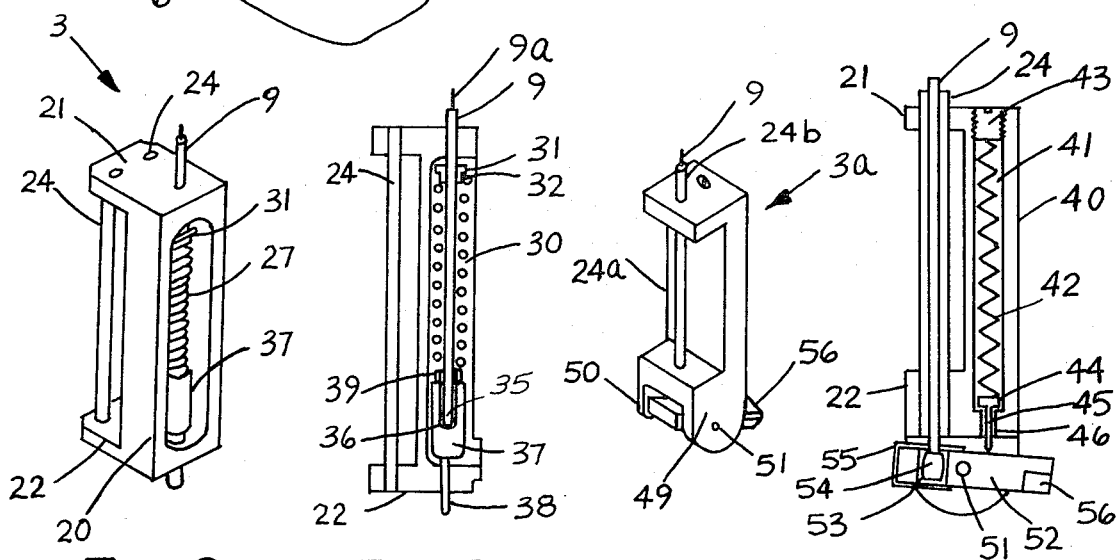
FIG. 2 is a perspective view of one of the stylus assemblies of FIG. 1 shown at an enlarged scale.
FIG. 3 is a side view of the stylus assembly shown in FIG. 2.
FIG. 5 is a perspective view of a modified stylus assembly in accordance with the invention.
FIG. 6 is a side view of the stylus assembly shown in FIG. 5.
Figures 4, 7:
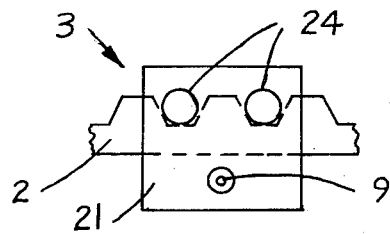
FIG. 4 is a top view of the stylus assembly shown in FIG. 3 with a section of the toothed belt in position.
FIG. 7 is a view corresponding to FIG. 4 but illustrating the stylus assembly of FIG. 5.

The stylus assembly 3 shown in detail in FIGS. 2, 3 and 4 includes a base or supporting member 20 adapted to make contact with the back of the belt 2. A pair of side portions or flange members 21 and 22 overlie the edge of the belt 2. The side members 21 and 22 are apertured to receive pin members 24 which are preferably frictionally engaged in the apertures although other known means may be used to secure the pin members 24 in position. The pin members 24 cooperate with the supporting member 20 in supporting the stylus assembly 3 on the belt 2 as claimed in our copending patent application Ser. No. 329,647 filed on even date herewith and titled Stylus Mounting For Belt-Type Facsimile Recorders.

In the stylus assembly 3 the stylus 9 has a tip of reduced cross sectional area 9a. The stylus 9 and associated parts are adapted to be received in a recess 30 in its base or supporting member 20. Secured to the stylus member 9 is an abutment member 31 which may have a portion of reduced cross section 32 to receive spring 27. The abutment 31 limits the outward movement of the stylus 9. At its inner end 35 the stylus member 9 is received in a recess 36 of an extension 37 of a ramp engaging member 38 which extends outwardly through an aperture in the side member 22. The upper end of the extension 37, as indicated at 39, is formed with a reduced cross section to provide lower abutment means for the spring 27.

As illustrated in FIG. 3 the ramp engaging member 38 is shown as urged upwardly by the ramp member 14 so as to tend to compress the spring 34 and urge the stylus 9 outwardly in marking position engaging the recording sheet 7. After passing the end of the ramp member 14 at the right hand edge of the sheet 7 the ramp engaging member 38 is released so that the compression on the spring 27 is reduced and the stylus member 9 drops down under the influence of gravity.

The stylus assembly 3a shown in detail in FIGS. 5, 6 and 7 differs from the stylus assembly 3 in that only a single mounting pin 24a is used made of tubular construction so as to receive the stylus 9. In this embodiment the stylus 9 is made of the same small diameter throughout its length as the mounting pin 24a may be extended as indicated at 24b to provide a support adjacent the marking end of the stylus 9. In the stylus assembly 3a its supporting or backing member 40 is provided with a recess 41 to receive a spring 42. The spring 42 is held in the recess 41 by a screw 43 threadedly engaged in the outer end thereof. At the lower end of the recess 41 is a spring plunger 44 having a lower portion 45 of reduced cross section. The lower end of the recess 41 is also made of reduced cross section as indicated at 46 to provide abutment means to limit the outward movement of the spring plunger 45.

An extension means in the form of a pair of flanges 49 and 50 are provided on the lower surface of the flange 22. The flanges are apertured to receive a pivot member 51 supporting a pivotable ramp engaging member 52. One end of the ramp engaging member 52 is apertured as indicated at 53 to receive an enlarged portion or collar 54 attached to the lower end of the stylus member 9. A clip 55 may be used to retain the collar 54 in position in its recess 53. The ramp engaging member 52 at its other end is provided with a beveled surface 56 adapted to engage the ramp 14. Because the stylus 9 of the stylus assembly 3a is normally extended by the spring 42 the ramp member 14 for the use of this embodiment is made in a form having a very short length so that the stylus 9 is withdrawn against the action of the spring 42 only as it passes the lefthand edge of the sheet 7.

The specific construction of mounting shown herein is described in our copending patent application Ser. No. 329,647 titled Stylus Mounting for Belt-Type Facsimile Recorder and filed on even date herewith. Alternately, the stylus assemblies 3 and 3a may be secured to the belt 2 utilizing any other suitable means of attachment.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

We claim:

1. A stylus assembly for a facsimile recorder including a toothed belt, the stylus assembly comprising
   a supporting member,
   a pair of apertured flanges on said supporting member,
   a stylus having tip and inner ends,
   means for reciprocably holding said stylus in alignment with the apertures in said flanges,
   spring means for urging the tip end of said stylus outwardly of one of said flanges,
   first abutment means limiting the outward movement of said stylus,
   and a guideway engaging member extending outwardly of the other of said flanges.

2. A stylus assembly according to claim 1 in which said supporting member is adapted to be positioned against the back of the toothed belt with which it is to be used and said flanges are arranged to overlie the edges of said belt.

3. A stylus assembly according to claim 1 in which the tip end of said stylus includes a marking tip of reduced cross sectional size as compared to the body of said stylus.

4. A stylus assembly according to claim 1 in which said means for reciprocably holding said stylus in alignment with said apertures in said flanges includes an extension for said guideway engaging member, said extension having a recess in its end receiving the inner end of said stylus, and means defining second abutment means for said spring means on said extension.

5. A stylus assembly according to claim 4 in which said means for reciprocably holding said stylus in alignment with said apertures is positioned in said supporting member on the back side of the belt with which it is to be used.

6. A stylus assembly according to claim 1 in which said means for reciprocably holding said stylus in alignment with said apertures is a tubular guiding member extending through said apertures, said stylus extending through said tubular member.

7. A stylus assembly according to claim 6 in which said stylus has the same cross-sectional size over its guided portion and tip end.

8. A stylus assembly according to claim 6 in which said supporting member is formed with a hollow passageway along its length in parallel with said stylus and said spring is positioned in said passageway, spring abutment means is provided for the stylus tip end of said passageway, said passageway having a reduced portion at its inner end, a plunger loaded by said spring projects through said reduced portion.

9. A stylus assembly according to claim 8 in which said guideway engaging member is pivotably mounted on said flange away from said stylus tip in swinging contact at one end with the inner end of said stylus and at its other end with said spring loaded plunger so that said stylus is resiliently urged outwardly from said tubular guiding member.

10. A stylus assembly according to claim 6 in which said apertures in said flanges holding said tubular guiding member are located in said flanges on the toothed side of the belt with which it is to be used.

* * * * *